United States Patent
Deibert et al.

(10) Patent No.: US 9,647,855 B2
(45) Date of Patent: May 9, 2017

(54) MOBILE PHONE PAYMENT WITH DISABLING FEATURE

(75) Inventors: Doug Deibert, Alameda, CA (US);
Erick Wong, San Francisco, CA (US);
Gavin Shenker, Los Angeles, CA (US);
David Wentker, San Francisco, CA (US)

(73) Assignee: Visa U.S.A. Inc., San Francisco, CA (US)

(*) Notice: Subject to any disclaimer, the term of this patent is extended or adjusted under 35 U.S.C. 154(b) by 641 days.

(21) Appl. No.: 11/971,586

(22) Filed: Jan. 9, 2008

(65) Prior Publication Data

US 2008/0172317 A1    Jul. 17, 2008

Related U.S. Application Data

(60) Provisional application No. 60/884,290, filed on Jan. 10, 2007, provisional application No. 60/884,212, filed on Jan. 9, 2007.

(51) Int. Cl.
| | |
|---|---|
| G06Q 20/10 | (2012.01) |
| H04L 12/66 | (2006.01) |
| G06Q 20/20 | (2012.01) |
| G06Q 20/32 | (2012.01) |
| G06Q 30/02 | (2012.01) |
| G06Q 40/00 | (2012.01) |

(52) U.S. Cl.
CPC ............ *H04L 12/66* (2013.01); *G06Q 20/10* (2013.01); *G06Q 20/20* (2013.01); *G06Q 20/202* (2013.01); *G06Q 20/204* (2013.01); *G06Q 20/32* (2013.01); *G06Q 20/322* (2013.01); *G06Q 20/3221* (2013.01); *G06Q 20/3278* (2013.01); *G06Q 30/0224* (2013.01); *G06Q 40/00* (2013.01)

(58) Field of Classification Search
CPC .................................. G06K 5/00; H04L 9/00
See application file for complete search history.

(56) References Cited

U.S. PATENT DOCUMENTS

| | | | | |
|---|---|---|---|---|
| 4,451,158 | A | * | 5/1984 | Selwyn et al. ................. 368/63 |
| 4,942,606 | A | * | 7/1990 | Kaiser et al. ................... 726/19 |
| 4,945,556 | A | * | 7/1990 | Namekawa ................... 455/565 |
| 5,220,501 | A |   | 6/1993 | Lawlor et al. |
| 5,465,206 | A |   | 11/1995 | Hilt et al. |
| 5,539,450 | A |   | 7/1996 | Handelman |
| 5,650,604 | A |   | 7/1997 | Marcous et al. |
| 5,652,786 | A |   | 7/1997 | Rogers |
| 5,659,165 | A |   | 8/1997 | Jennings et al. |
| 5,689,638 | A | * | 11/1997 | Sadovsky ........................ 726/21 |
| 5,699,528 | A |   | 12/1997 | Hogan |
| 5,729,460 | A |   | 3/1998 | Plett et al. |

(Continued)

OTHER PUBLICATIONS

PCT International Search Report, Application Serial No. PCT/US08/50638, Apr. 10, 2008, 1 page.

(Continued)

*Primary Examiner* — Chika Ojiaku
(74) *Attorney, Agent, or Firm* — Kilpatrick Townsend & Stockton LLP

(57) ABSTRACT

A method and system for payments for mobile phone payments with a disabling feature is disclosed. The method includes activating a mobile phone containing contactless payment systems, and having a timeout feature disable the contactless payment systems after a set period of time.

9 Claims, 6 Drawing Sheets

(56) References Cited

U.S. PATENT DOCUMENTS

| | | | |
|---|---|---|---|
| 5,794,210 A | 8/1998 | Goldhaber et al. | |
| 5,815,657 A * | 9/1998 | Williams et al. | 705/35 |
| 5,826,241 A | 10/1998 | Stein et al. | |
| 5,857,191 A * | 1/1999 | Blackwell et al. | 707/10 |
| 5,872,915 A * | 2/1999 | Dykes et al. | 726/5 |
| 5,889,958 A * | 3/1999 | Willens | 709/229 |
| 5,903,720 A * | 5/1999 | Stokes | 726/4 |
| 5,905,860 A * | 5/1999 | Olsen et al. | 726/27 |
| 5,925,126 A * | 7/1999 | Hsieh | 726/19 |
| 5,937,396 A | 8/1999 | Konya | |
| 5,945,652 A | 8/1999 | Ohki et al. | |
| 5,949,044 A | 9/1999 | Walker et al. | |
| 5,991,748 A | 11/1999 | Taskett | |
| 6,006,334 A * | 12/1999 | Nguyen et al. | 726/5 |
| 6,041,357 A * | 3/2000 | Kunzelman et al. | 709/228 |
| 6,169,974 B1 | 1/2001 | Baumgartner et al. | |
| 6,267,292 B1 | 7/2001 | Walker et al. | |
| 6,295,522 B1 | 9/2001 | Boesch et al. | |
| 6,360,326 B1 * | 3/2002 | Hiles | 726/19 |
| 6,374,145 B1 * | 4/2002 | Lignoul | 700/17 |
| 6,394,343 B1 | 5/2002 | Berg et al. | |
| 6,418,420 B1 | 7/2002 | DiGiorgio et al. | |
| 6,439,456 B1 | 8/2002 | Bansal et al. | |
| 6,488,203 B1 | 12/2002 | Stoutenberg et al. | |
| 6,502,747 B1 | 1/2003 | Stoutenberg et al. | |
| 6,550,010 B1 * | 4/2003 | Link et al. | 713/168 |
| 6,609,113 B1 | 8/2003 | O'Leary et al. | |
| 6,612,487 B2 | 9/2003 | Tidball et al. | |
| 6,761,309 B2 | 7/2004 | Stoutenberg et al. | |
| 6,769,605 B1 | 8/2004 | Magness | |
| 6,814,282 B2 | 11/2004 | Seifert et al. | |
| 6,898,711 B1 * | 5/2005 | Bauman et al. | 713/185 |
| 6,915,279 B2 * | 7/2005 | Hogan et al. | 705/64 |
| 6,994,251 B2 | 2/2006 | Hansen et al. | |
| 7,003,493 B2 | 2/2006 | Weichert et al. | |
| 7,031,939 B1 | 4/2006 | Gallagher et al. | |
| 7,070,094 B2 | 7/2006 | Stoutenberg et al. | |
| 7,100,203 B1 * | 8/2006 | Tosey | 726/17 |
| 7,107,455 B1 * | 9/2006 | Merkin | 713/182 |
| 7,120,608 B1 | 10/2006 | Gallagher et al. | |
| 7,128,274 B2 * | 10/2006 | Kelley et al. | 235/492 |
| 7,194,437 B1 | 3/2007 | Britto et al. | |
| 7,225,156 B2 | 5/2007 | Fisher et al. | |
| 7,281,130 B2 * | 10/2007 | Johnson et al. | 713/162 |
| 7,299,364 B2 * | 11/2007 | Noble et al. | 713/189 |
| 7,303,120 B2 * | 12/2007 | Beenau et al. | 235/380 |
| 7,340,772 B2 * | 3/2008 | Panasyuk et al. | 726/15 |
| 7,356,357 B2 * | 4/2008 | DeCost et al. | 455/566 |
| 7,360,689 B2 * | 4/2008 | Beenau et al. | 235/380 |
| 7,373,329 B2 | 5/2008 | Gallagher et al. | |
| 7,373,516 B2 * | 5/2008 | Ashok et al. | 713/183 |
| 7,395,241 B1 | 7/2008 | Cook et al. | |
| 7,415,442 B1 | 8/2008 | Battaglini et al. | |
| 7,447,663 B1 | 11/2008 | Barker et al. | |
| 7,451,114 B1 | 11/2008 | Matsuda et al. | |
| 7,454,232 B2 | 11/2008 | Abuhamdeh | |
| 7,502,726 B2 * | 3/2009 | Panasyuk et al. | 703/22 |
| 7,673,340 B1 * | 3/2010 | Cohen et al. | 726/22 |
| 7,730,169 B1 * | 6/2010 | Greschler | G06F 9/54 |
| | | | 707/999.104 |
| 7,835,960 B2 * | 11/2010 | Breck et al. | 705/35 |
| 7,987,501 B2 * | 7/2011 | Miller et al. | 726/8 |
| 8,140,418 B1 * | 3/2012 | Casey et al. | 705/35 |
| 8,190,908 B2 * | 5/2012 | Jazayeri et al. | 713/186 |
| 8,332,272 B2 | 12/2012 | Fisher | |
| 2001/0011355 A1 * | 8/2001 | Kawai | 713/202 |
| 2001/0047335 A1 * | 11/2001 | Arndt | G06Q 20/04 |
| | | | 705/44 |
| 2001/0051531 A1 | 12/2001 | Singhal et al. | |
| 2002/0049804 A1 | 4/2002 | Rodriguez et al. | |
| 2002/0082995 A1 * | 6/2002 | Christie, IV | 705/44 |
| 2002/0091745 A1 * | 7/2002 | Ramamurthy et al. | 709/100 |
| 2002/0128967 A1 | 9/2002 | Meyer et al. | |
| 2002/0152168 A1 | 10/2002 | Neofytides et al. | |
| 2002/0152211 A1 * | 10/2002 | Jam | 707/9 |
| 2002/0174016 A1 | 11/2002 | Cuervo | |
| 2003/0026429 A1 | 2/2003 | Hammersmith | |
| 2003/0061162 A1 | 3/2003 | Matthews | |
| 2003/0065940 A1 * | 4/2003 | Brezak et al. | 713/201 |
| 2003/0084165 A1 * | 5/2003 | Kjellberg et al. | 709/227 |
| 2003/0105710 A1 | 6/2003 | Barbara et al. | |
| 2003/0130940 A1 | 7/2003 | Hansen et al. | |
| 2004/0039693 A1 | 2/2004 | Nauman et al. | |
| 2004/0073792 A1 * | 4/2004 | Noble et al. | 713/168 |
| 2004/0098628 A1 * | 5/2004 | Butler | G06F 21/46 |
| | | | 726/6 |
| 2004/0127256 A1 * | 7/2004 | Goldthwaite et al. | 455/558 |
| 2004/0188515 A1 | 9/2004 | Jiminez | |
| 2004/0225718 A1 | 11/2004 | Heinzel et al. | |
| 2004/0264395 A1 * | 12/2004 | Rao | 370/311 |
| 2004/0266491 A1 * | 12/2004 | Howard et al. | 455/567 |
| 2005/0044423 A1 * | 2/2005 | Mellmer et al. | 713/201 |
| 2005/0080697 A1 | 4/2005 | Foss et al. | |
| 2005/0120255 A1 * | 6/2005 | Padawer et al. | 713/320 |
| 2005/0138390 A1 * | 6/2005 | Adams et al. | 713/185 |
| 2005/0154886 A1 * | 7/2005 | Birk et al. | 713/168 |
| 2005/0182962 A1 * | 8/2005 | Given et al. | 713/200 |
| 2005/0209958 A1 | 9/2005 | Michelsen et al. | |
| 2005/0222949 A1 | 10/2005 | Inotay et al. | |
| 2005/0254650 A1 * | 11/2005 | Sakurai | G06F 21/36 |
| | | | 380/268 |
| 2005/0269402 A1 * | 12/2005 | Spitzer et al. | 235/380 |
| 2006/0161786 A1 * | 7/2006 | Rao | 713/183 |
| 2006/0165060 A1 | 7/2006 | Dua | |
| 2006/0253389 A1 * | 11/2006 | Hagale | G06Q 20/10 |
| | | | 705/39 |
| 2006/0265508 A1 * | 11/2006 | Angel et al. | 709/230 |
| 2006/0282373 A1 * | 12/2006 | Stone | 705/38 |
| 2007/0045401 A1 | 3/2007 | Sturm | |
| 2007/0057043 A1 | 3/2007 | de la Garza Ortega et al. | |
| 2007/0094132 A1 | 4/2007 | Waterson et al. | |
| 2007/0175978 A1 * | 8/2007 | Stambaugh | 235/379 |
| 2007/0185980 A1 * | 8/2007 | Abraham et al. | 709/222 |
| 2007/0235539 A1 * | 10/2007 | Sevanto et al. | 235/451 |
| 2007/0244811 A1 * | 10/2007 | Tumminaro | 705/39 |
| 2007/0262139 A1 * | 11/2007 | Fiebiger | G06Q 20/20 |
| | | | 235/380 |
| 2008/0010191 A1 | 1/2008 | Rackley, III et al. | |
| 2008/0011833 A1 * | 1/2008 | Saarisalo | 235/382 |
| 2008/0033877 A1 | 2/2008 | Blair et al. | |
| 2008/0040265 A1 * | 2/2008 | Rackley, III et al. | 705/40 |
| 2008/0086759 A1 * | 4/2008 | Colson | 726/2 |
| 2008/0109895 A1 * | 5/2008 | Janevski | 726/19 |
| 2008/0114699 A1 * | 5/2008 | Yuan et al. | 705/78 |
| 2008/0120231 A1 | 5/2008 | Megwa | |
| 2008/0126145 A1 * | 5/2008 | Rackley, III et al. | 705/7 |
| 2008/0162361 A1 * | 7/2008 | Sklovsky et al. | 705/65 |
| 2008/0263640 A1 * | 10/2008 | Brown | 726/5 |
| 2009/0047929 A1 * | 2/2009 | Chesnutt et al. | 455/411 |
| 2009/0098825 A1 * | 4/2009 | Huomo | G06Q 20/20 |
| | | | 455/41.1 |
| 2009/0106160 A1 * | 4/2009 | Skowronek | G06Q 20/045 |
| | | | 705/75 |
| 2009/0307133 A1 * | 12/2009 | Holloway et al. | 705/44 |
| 2011/0239304 A1 | 9/2011 | Saarisalo | |
| 2013/0217459 A1 * | 8/2013 | Luciano, Jr. | G07F 17/3255 |
| | | | 463/16 |

OTHER PUBLICATIONS

U.S. Appl. No. 11/971,687.
U.S. Appl. No. 11/971,711.
U.S. Appl. No. 11/971,715.
Dialog, http://www.dialogclassic.com/, Nov. 1, 2010, 1 page.
JP (JPMASTER77), PHP Login Script with Remember Me Feature, from online post on website evolt.org, Jan. 25, 2004, 16 pages.
Non-Final Office Action, issued Feb. 2, 2016, in U.S. Appl. No. 14/543,608, 11 pages.
Final Office Action, issued Jul. 20, 2016, in U.S. Appl. No. 14/543,608, 14 pages.
Office Action mailed Feb. 13, 2014 in U.S. Appl. No. 11/971,715, 12 pages.

(56) References Cited

OTHER PUBLICATIONS

Office Action mailed Mar. 1, 2013 in U.S. Appl. No. 11/971,687, 29 pages.
Office Action mailed May 22, 2014 in U.S. Appl. No. 11/971,711, 27 pages.

* cited by examiner

MOBILE PHONE PAYMENT WITH DISABLING FEATURE

CROSS-REFERENCES TO RELATED APPLICATIONS

This patent application is a non-provisional of and claims priority to U.S. provisional patent application No. 60/884,212, filed on Jan. 9, 2007 and U.S. provisional patent application No. 60/884,290, filed on Jan. 10, 2007, both of which are herein incorporated by reference in their entirety for all purposes.

This application is also related to U.S. patent application Ser. No. 11/971,687, entitled "Contactless Transaction", filed on the same day as the present application, and is also related to U.S. patent application Ser. No. 11/971,715, entitled "Mobile Payment Management", filed on the same day as the present application, and is also related to U.S. patent application Ser. No. 11/971,711, entitled "Mobile Phone Payment Process including Threshold Indicator", filed on the same day as the present application. These applications are herein incorporated by reference in their entirety for all purposes.

BACKGROUND

With advancements in technology, contactless payment systems such as contactless cards have begun to proliferate as a means for conducting transactions. Contactless payment cards can communicate with contactless readers in point of sale (POS) devices or contactless readers, when they are close together.

Usage of a contactless card requires a consumer to carry the contactless card, of course. This results in additional items carried by already overloaded consumers. Another problem with a contactless payment card is that, since it only needs to be proximate to a contactless reader to read data from it, it is possible that an unauthorized person might use an unauthorized reader to "sniff" data from the contactless card when the contactless card is not being used in a transaction.

Embodiments of the invention address these and other problems, individually and collectively.

BRIEF SUMMARY

Embodiments of the invention are directed to improved mobile phone payment systems and methods with a disabling feature.

One embodiment of the invention is directed to a method. The method comprises entering a predetermined timeout time into a mobile phone, where the mobile phone comprises a contactless element that is configured to be read by a contactless reader in an access device. The method also includes executing a mobile payment application associated with the mobile phone, and disabling the mobile payment application after the predetermined timeout time has elapsed.

Another embodiment of the invention is directed to a computer readable medium comprising code for allowing a contactless element in a mobile phone to communicate with a contactless reader in an access device, code for entering a predetermined timeout time, code for executing a mobile payment application associated with the mobile phone, and code for disabling the mobile payment application after the predetermined timeout time has elapsed.

Another embodiment of the invention is directed to a method comprising transmitting data related to a mobile payment application to a mobile phone comprising a contactless element, wherein the data comprises a timer for a predetermined timeout time such that the mobile payment application is disabled after the predetermined timeout time has elapsed.

These and other embodiments of the invention are described in further detail below.

DETAILED DESCRIPTION

I. Mobile Transaction Systems

Figure 1:
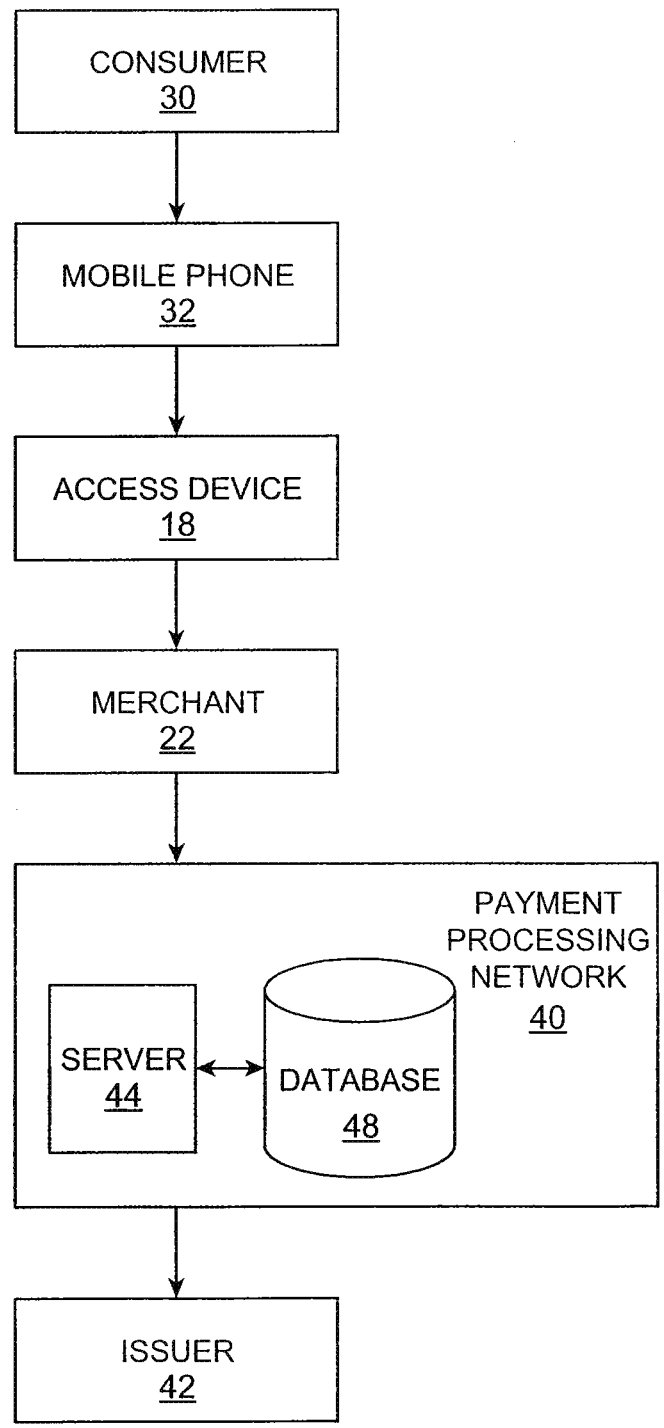
FIG. 1 shows a block diagram of a system according to an embodiment of the invention.

The environment is ripe for the development of payment and payment-related services in the mobile phone ecosystem. Consumer demand for all-purpose multi-functional mobile phones is increasing. Technology that supports a mobile payments infrastructure is emerging (i.e., contactless payment acceptance infrastructure, Near field communication (NFC)-enabled mobile phones, and robust mobile networks). There is increasing collaboration between wireless and financial services. The mobile phone has the potential to enhance the security and convenience of using a payment product as well as introduce payment products to parts of the world that don't currently have a support infrastructure for traditional payment products.

Embodiments of the invention are directed towards the use of a mobile telephone, or mobile phone, as a contactless payment device. The mobile phone can contain a mobile payment application that is a software application that stores payment details, such as a credit card number and related information. When consumers wish to make a purchase from a merchant, they can place their mobile phones in proximity to an access device associated with the merchant. The mobile payment application may then send the payment details to the access device over a wireless connection. From there the transaction may progress similarly to the progression of a purchase with a traditional credit card.

To make a payment using a mobile phone, the mobile payment application stored on the phone is executed so that the payment can be made with the mobile phone. In certain embodiments of the invention, there can be two modes of operation of the mobile phone relating to execution.

In a first mode of operation according to an embodiment of the invention, the consumer, or user, sets the mobile phone application as "always on." In this mode of operation, the mobile payment application on the phone is always in an execution mode when the mobile phone is powered on. To make a payment, the consumer can place the mobile phone close to an access device such as a POS terminal with a contactless reader, and payment information (e.g., account information) will be transmitted from the mobile phone to the contactless reader (and therefore the POS terminal). Whenever the mobile phone is powered on, the mobile payment application can automatically execute. To deactivate the mobile payment application, the consumer can manually deactivate it by changing settings on the mobile phone. In this first mode, the mobile payment application is always active, and as such, payment information can be transmitted anytime the phone is located near an access device.

The second mode of operation, according to embodiments of the invention, can help prevent the accidental transmittal of information as can occur in the first mode. In the second mode of operation, the user can manually select the mobile phone application each time before making a purchase. In this method, the mobile phone normally resides in the "idle" state, such that it does not transmit any payment information to an access device, even when placed in proximity to one. To conduct a transaction, the consumer can execute the mobile payment application on the mobile phone by selecting it, typically by using a shortcut key on the phone or by navigating to a menu system on the display of the mobile phone and by selecting an appropriate menu item. Once the mobile payment application is active, the mobile phone will transmit payment information when placed in proximity with an access device.

In this method of execution of the mobile phone application, the application remains active until a transaction has occurred. Once a transaction has occurred, the mobile phone can go back to the idle state. However, there may be occasions when the consumer activates the mobile payment application, but then does not intend to continue with a payment transaction. On such occasions, the mobile payment application would still remain active, and could unintentionally transmit payment information to an unauthorized contactless reader. To prevent this, the consumer can manually disable the mobile phone application, thereby returning the mobile phone to the idle state. Still, there are times when the user may forget to do so, leaving the mobile payment application active.

In preferred embodiments of the invention, the mobile phone comprises a predetermined timeout time. Using this feature, the mobile phone can automatically disable the mobile payment application after a set amount of time (the predetermined timeout time) has elapsed. In certain implementations, a countdown timer on the mobile phone will start to count down from the predetermined timeout time once the mobile payment application has been executed. If a payment transaction with the phone takes place, the phone will reset back to the idle state after the payment transaction is completed, and the timer will likewise reset and stop counting. If no payment transaction occurs within the predetermined timeout time, then after the predetermined timeout time, the mobile payment application on the phone will automatically disable so that contactless payments cannot be made. The mobile phone can return to the idle state. When this happens, the timer will stop counting and be reset back to the predetermined timeout time, to be used when the mobile payment application is next activated.

If the predetermined timeout time elapses and therefore the mobile payment application deactivates, then no payment information will be sent even in the event the mobile phone is placed near an access device. The phone can remain in the idle state until the user again activates the mobile payment application. If the user activates a mobile payment application to make a payment transaction, but then the user waits longer than the predetermined timeout time to conduct the transaction, then the mobile phone will not be able to conduct the payment transaction when it is placed next to an access device. In this case, the consumer can activate the payment application again, and can then present the phone to the access device again (within the predetermined time), in order to conduct and complete the transaction. In embodiments of the invention, the duration of the predetermined timeout time may be set by the user, or may be set by another entity such as the mobile phone carrier or the financial institution associated with the payment information stored on the mobile payment application.

In certain embodiments, the mobile phone may contain more than one mobile payment application or mobile payment application instance. In these embodiments, the mobile phone can contain a plurality of mobile payment applications or instances. Each of the plurality of mobile payment applications or instances can be associated with different payment details. In some implementations, each mobile payment application or instance on a mobile phone is associated with a specific issuer, and each may contain different payment information, and may be associated with different issuer specific payment services. For example, a single mobile phone may contain three instances of a mobile payment application. The first instance may contain credit card information relating to a Bank A credit card. The second instance may contain information relating to a Bank B credit card. The third instance may contain information relating to a debit card associated with a checking account with a Bank C. The consumer can select the payment service of Bank A, Bank B, or Bank C to make a payment using the corresponding account.

In certain embodiments, a consumer can set one of the issuer-specific payment services as a default. The default payment service will then be used for payment transactions conducted using the phone, barring further action by the consumer. In the above example, using the mobile phone, the consumer may choose the first issuer specific payment service as the default mobile payment application. When the consumer uses the mobile phone in a payment transaction, the default mobile payment application associated with the selected payment service will be used. The consumer may change the default payment service at a later date. Also, in some embodiments, the consumer can select an issuer specific payment service to be a default service for a predetermined number (e.g., one) of transactions.

Also, in some embodiments, each payment service can be associated with its own predetermined timeout time. Also, the duration of timeout times can vary according to issuer or consumer preference.

Specific embodiments of the invention can be described with reference to FIGS. 1-7.

FIG. 1 shows a system according to an embodiment of the invention. Other systems according to embodiments of the invention may include fewer or more components than are specifically shown in FIG. 1.

FIG. 1 shows a consumer 30, a mobile phone 32, an access device 18, a merchant 22, a payment processing network 40, and an issuer 42, in operative communication with each other. The merchant 22 and issuer 42 can communicate through the payment processing network 40. As used herein, an "issuer" is typically a business entity (e.g., a bank) which maintains financial accounts for the consumer and often issues a portable consumer device such as a credit or debit card to the consumer. In embodiments of the invention, the issuer 42 has issued a mobile payment application to the consumer 30. The mobile payment application will be used with the mobile phone 32. When the consumer 30 wishes to conduct a payment transaction with the merchant 22, she will (if needed) activate the mobile payment application on the mobile phone (as more fully explained below), and position the mobile phone 32 near the access device 18 so that the two devices communicate wirelessly. The access device 18 can read the payment data from the mobile phone 32, and provide that data to the merchant 22. The merchant 22 can contact the issuer 42 associated with the payment account through the payment processing network 40, to receive either an authorization or a denial for the transaction.

The payment processing network 40 may have a server computer 44, as well as a database 48. The server computer 44 is typically a powerful computer or cluster of computers. For example, the server computer can be a large mainframe, a minicomputer cluster, or a group of servers functioning as a unit. In one example, the server computer may be a database server coupled to a web server.

The payment processing network 40 may comprise or use a payment processing network such as VisaNet™. The payment processing network 40 and any communication network that communicates with the payment processing network 40 may use any other suitable wired or wireless network, including the Internet. The payment processing network 40 may be adapted to process ordinary debit or credit card transactions.

The server computer 44 may comprise or be associated with a computer readable medium comprising code for receiving information regarding a payment account, and then determining the issuer associated with that payment account. The computer readable medium may also comprise code for using the payment account information to route any authorization request message to the appropriate issuer 42.

For simplicity of illustration, one mobile phone 32, one access device 18, one merchant 22, and one issuer 42 are shown. However, it is understood that in embodiments of the invention, there can be multiple mobile phones, access devices, merchants, issuers, as well as server computers, databases, accounts, etc.

Figure 2:
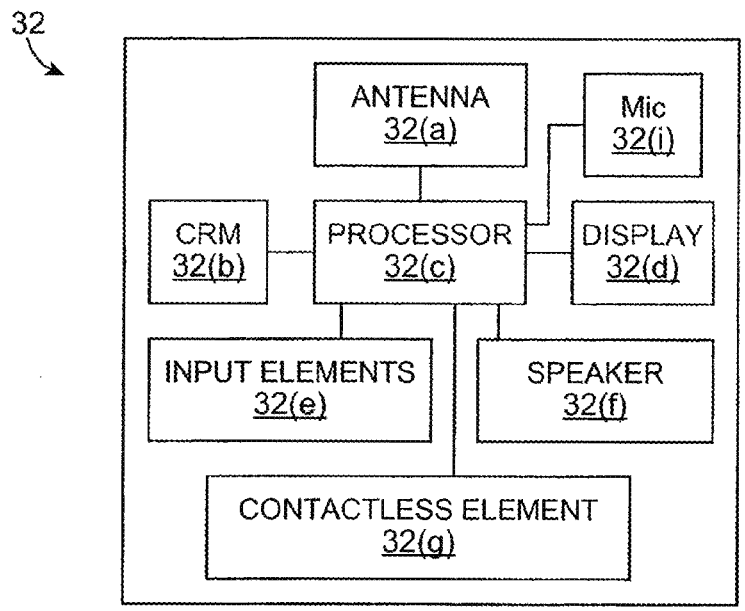
FIG. 2 shows a block diagram of a mobile phone according to an embodiment of the invention.

An exemplary mobile phone 32 may comprise a computer readable medium and a body as shown in FIG. 2. (FIG. 2 shows a number of components, and the mobile phones according to embodiments of the invention may comprise any suitable combination or subset of such components.) The computer readable medium 32(*b*) may be present within the body 32(*h*), or may be detachable from it. The body 32(*h*) may be in the form a plastic substrate, housing, or other structure. The computer readable medium 32(*b*) may be a memory that stores data and may be in any suitable form including a magnetic stripe, a memory chip, etc. The memory preferably stores information such as payment account information, which may comprise financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the mobile phone 32.

In some embodiments information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The mobile phone 32 may further include a contactless element 32(*g*), which is typically implemented in the form of a semiconductor chip (or other data storage element) with an associated wireless transfer (e.g., data transmission) element, such as an antenna. Contactless element 32(*g*) is associated with (e.g., embedded within) mobile phone 32 and data or control instructions may be applied to contactless element 32(*g*) by the processor 32(*c*).

Contactless element 32(*g*) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile phone 32 and an interrogation device such as an access device. The access device should have a contactless reader that can read the contactless element 32(*g*). Thus, the mobile phone 32 is capable of communicating and transferring data and/or control instructions via both cellular network and near field communications capability.

The mobile phone 32 may also include a processor 32(*c*) (e.g., a microprocessor) for processing the functions of the mobile phone 32 and a display 32(*d*) to allow a consumer to see phone numbers and other information and messages. The mobile phone 32 may further include input elements 32(*e*) to allow a consumer to input information into the phone, a speaker 32(*f*) to allow the consumer to hear voice communication, music, etc., and a microphone 32(*i*) to allow the consumer to transmit her voice through the mobile phone 32. The mobile phone 32 may also include an antenna 32(*a*) for wireless data transfer (e.g., data transmission over a wireless network).

The mobile phone 32 may contain a plurality of copies, or instances, of the mobile payment application. Code for the plurality of mobile payment applications may reside on computer readable medium 32(*b*) of the mobile phone 32. Computer readable medium 32(*b*) may also comprise code relating to a timer that automatically deactivates any mobile payment applications after a predetermined timeout time has elapsed, code for displaying the timer in the mobile phone display, code for executing the mobile payment applications on the mobile phone, and code for allowing contactless element to communicate with the contactless reader in an access device. In certain embodiments, the mobile payment application is a J2ME/MIDP 2.0 application (MIDlet). Mobile Information Device Profile (MIDP) is the specification published for the use of Java on embedded devices such as mobile phones. Each mobile payment application instance can be customized and configured for a specific issuer. The data for the mobile payment application can be transmitted by being provisioned over-the-air (OTA), installed, activated, and configured according to the issuer's specifications on the mobile phone during service activation. Once configured an application instance may appear as an entry in the phone's main menu folder for mobile payments and other financial applications. In some embodiments, there can be more than one application instance on the menu based on the number of instances of the mobile payment application that have been activated and configured on the mobile phone.

Figure 3:
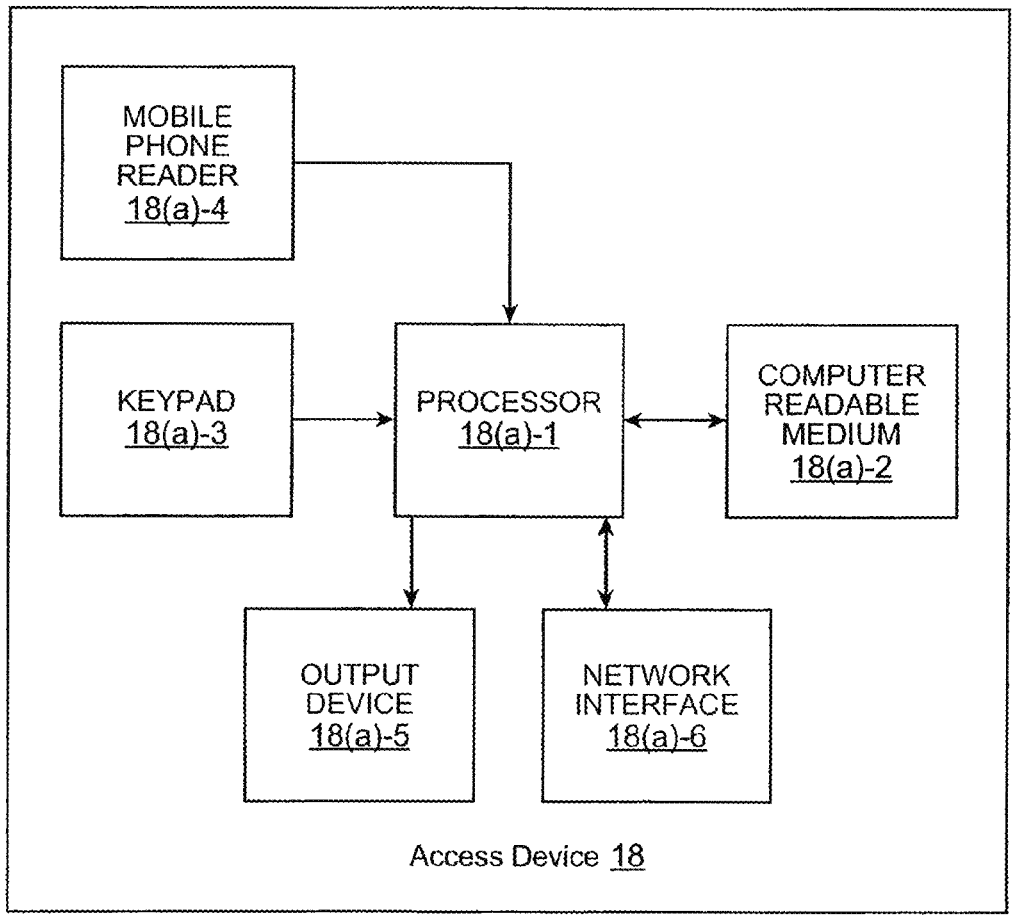
FIG. 3 shows a block diagram of an access device according to an embodiment of the invention.

FIG. 3 shows a block diagram showing basic components that may reside in a contactless reader or POS terminal such as access device 18. An exemplary access device 18 may comprise a processor 18(a)-1, a computer readable medium 18(a)-2, a keypad 18(a)-3, a mobile phone reader 18(a)-4, an output device 18(a)-5, and a network interface 18(a)-6, which can all be operatively coupled to the processor 18(a)-1. Exemplary mobile phone readers can include RF (radio frequency) antennas that interact with the mobile phone 32 through near field communications. Suitable output devices may include displays and audio output devices. Exemplary computer readable media may include one or more memory chips, disk drives, etc. The network interface 18(a)-6 may allow the access device 18 to send and receive messages from the merchant 22, payment processing network 40, and/or the issuer 42.

In order to conduct purchase transactions using the components in FIGS. 1-3, the mobile phone 32 and mobile payment application is first configured. Then, the mobile phone 32 can be used to conduct payment transactions. These procedures are explained in detail below.

II. Configuring the Mobile Phone

Once the mobile payment application has been provisioned and installed on a mobile phone, it is configured to allow payment transactions to be conducted using the phone. As described above, more than one mobile payment application or instance may be installed on the mobile phone. For such cases, each application or instance may be individually configured if desired or configured in the same way.

Figure 5:
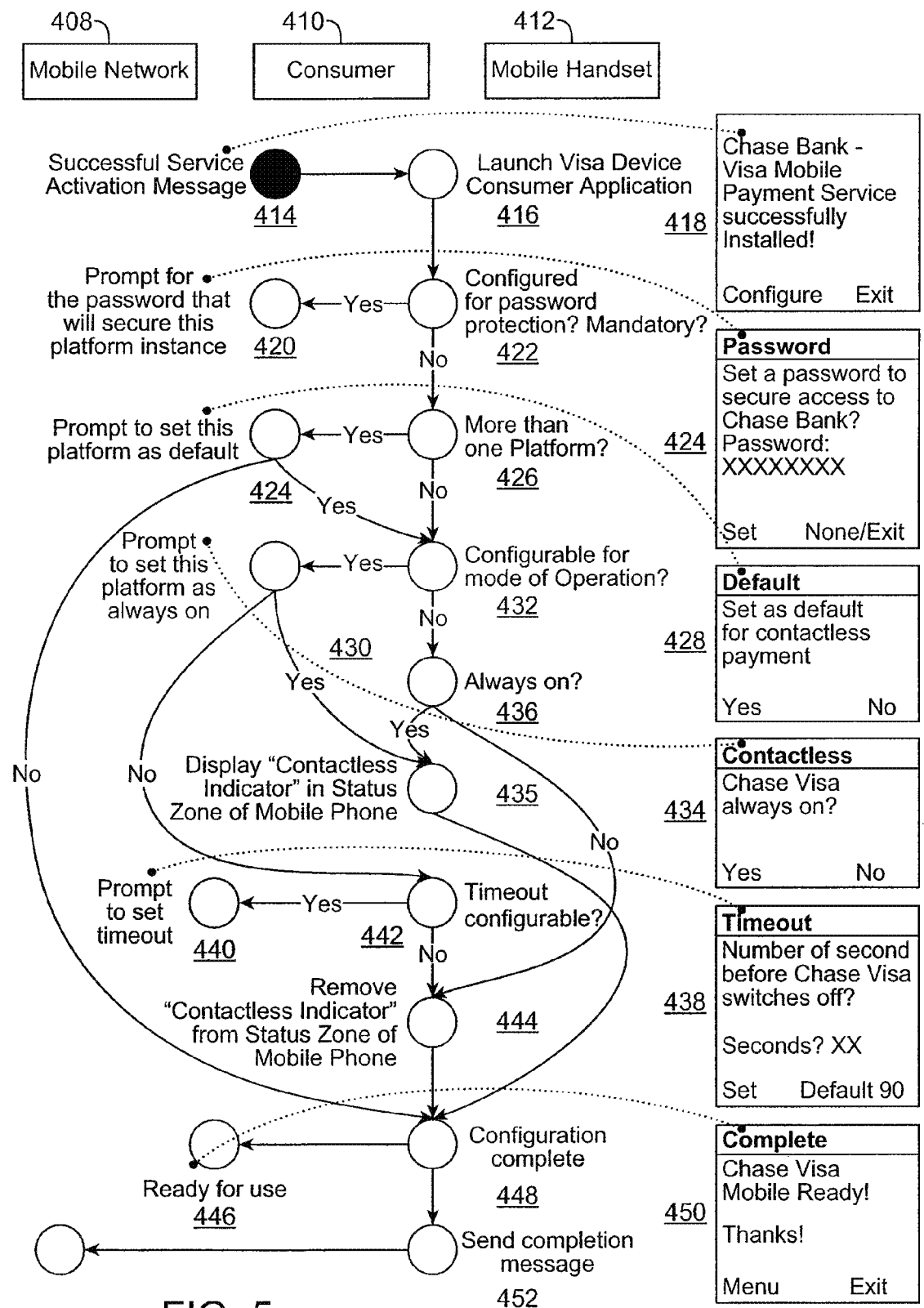
FIG. 5 shows a flowchart illustrating a method according to an embodiment of the invention.

FIG. 5 shows the steps taken to configure a mobile payment application on a mobile phone according to an embodiment of the invention, along with screen shots of what the display of the mobile phone may show during certain steps. In FIG. 5, steps located below Mobile Handset 412 are the steps that may be performed by the mobile payment application, and the steps located under Consumer 410 are the steps that may be performed by the user of the handset.

A payment service can first be activated on the phone. Once the mobile phone has received a message saying the selected payment application has successfully been installed and there is service activation (step 414 and screen shot 418), the application can be launched as in step 416. Once launched, the mobile payment application checks its own configuration to determine if any user modifications are possible. If no configuration modifications are allowed, then the process jumps to step 448, the configuration is complete, the display screen 450 is shown, and the mobile payment application is ready for use as in step 446.

If configuration options are allowed, the mobile payment application can allow the consumer to accept the default configuration option or modify some or all of the configuration options. In step 422, the application checks if a password is mandatory. If so, the user is prompted to enter a password in step 420. The requirements for the password may vary. In one implementation, the password may be required to consist of between 4 and 8 letters or numbers. Screen shot 424 shows what the display screen of the mobile phone will look like during step 420.

Next, the application checks to see if there are any other issuer specific software platforms installed on the mobile phone in step 426. If there are other platforms installed, the consumer is prompted to choose whether the currently configurable platform is the default application in step 424 and as shown in screen shot 428. If the currently configured platform is not chosen as the default (i.e., another instance is the default), then the configuration process is completed as in step 448.

If there are no other platforms installed, or if the currently configured platform is set as the default platform, the mobile payment application then checks to see if the mode of operation can be configured to be always on in step 432. If it can be so configured, the application prompts the user to set the application as either always on or in manual activation mode in step 430 and as shown in screen shot 434. The "always on" feature may alternatively be predetermined and not configurable by the user, as shown in step 436. In either case, if the platform is set to be always on, the phone can be configured to display an indicator alerting the user as such in step 435.

If the consumer has the option to configure the mode of operation of the platform, the user can choose to not set the application associated with the platform as always on, but can choose to require manual activation prior to each purchase. If that configuration is chosen, the mobile payment application can check to see if a predetermined timeout time is configurable 442. If so, the application may prompt the user to enter the duration of the predetermined timeout time into the mobile phone in step 440 and as shown in screen shot 438. As can be seen from screen shot 438, in that implementation, the default predetermined timeout time can be 90 seconds. In other implementations the predetermined timeout time can be for other durations, such as 30 seconds, 60 seconds, 100 seconds, etc. If the duration is configurable by the user, the user may be allowed choose any number of seconds, from 00-99, as shown in screen shot 438.

Alternatively, the predetermined timeout time may not be configurable by the user, as shown in step 442. In that implementation, the predetermined timeout time is entered into the mobile phone when the mobile payment application is provisioned and installed. The duration of the predetermined timeout time may be chosen by the issuer associated with the mobile payment application, the mobile carrier, an organization associated with the payment processing network, or some other institution. Furthermore, after the mobile payment application has been fully configured, the duration of the predetermined timeout time may be changed by the appropriate party such as the issuer or organization associated with the payment processing network. A signal can be received by the mobile phone OTA (such as through the wireless network) that reconfigures the mobile payment application and adjusts the duration of the predetermined timeout time.

If the predetermined timeout time is not configurable, the phone can be configured to remove an indicator alerting the user that the mobile payment application is currently active from its display in step 444. Such indicator only needs to be displayed while the mobile payment application is active. Upon completion of the configuration process (step 448), the phone becomes ready to use in step 446 and displays screen shot 450. At that point, a completion message is sent by the phone in step 452, and it may be sent through the wireless network 408 to be received by the payment processing network and the issuer, to alert the institutions of the activation of a new mobile payment application.

III. Using the Mobile Phone

Figure 4:
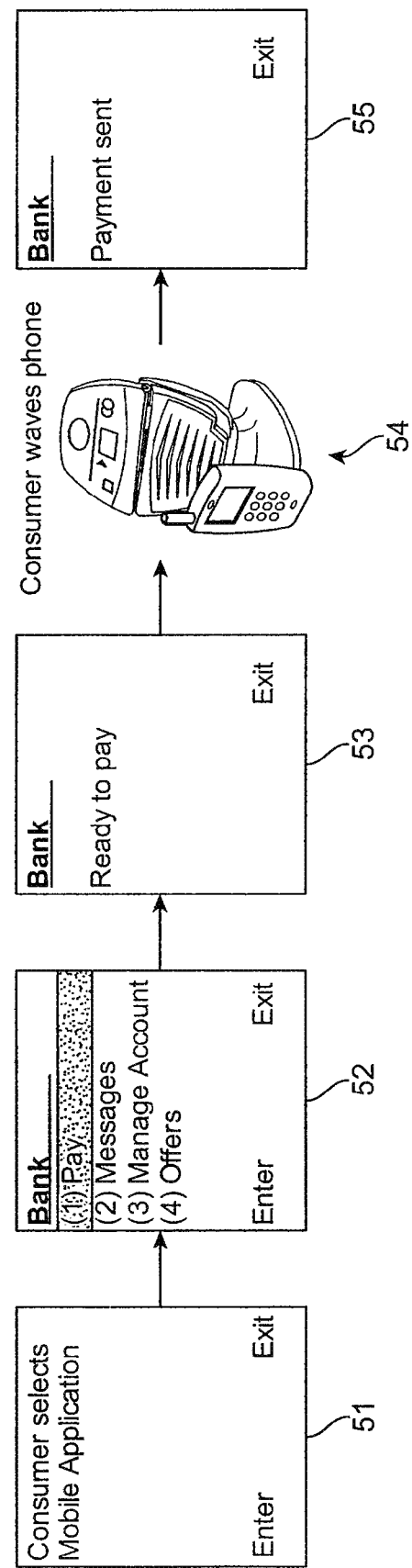
FIG. 4 shows a flowchart illustrating the various display screens of a mobile phone during a method according to an embodiment of the invention.

Once the mobile payment application has been configured, it may be used in payment transactions. FIG. 4 shows a progression of screen shots of the display of a mobile phone that is being used in a payment transaction. In this embodiment, the mobile payment application associated with the mobile phone is set to a manual activation mode of operation (i.e., the user will need to select the application prior to using the mobile phone in a transaction). In screen shot 51, the user (i.e., the consumer) is shown executing the mobile payment application. In screen shot 52, the pay functionality of the mobile payment application is selected. Once selected, the application shows that it is ready to engage in a payment transaction in screen shot 53. The consumer brings the mobile phone in proximity to the access device (or "waves" the mobile phone at the access device) in step 54 to effect the payment transaction. Once the payment transaction is completed, the mobile phone display shows a confirmation in screen shot 55.

Figure 6:
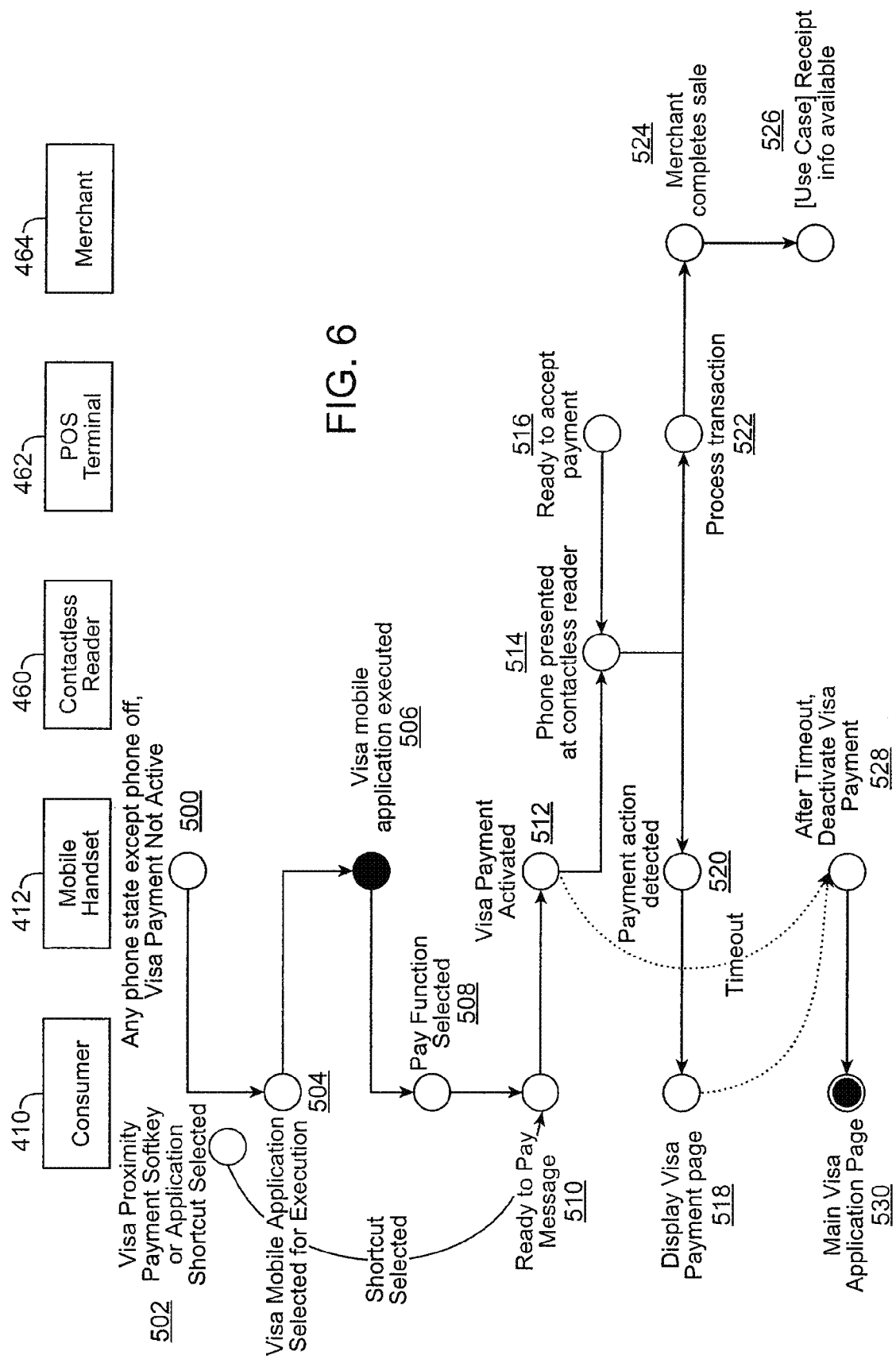
FIG. 6 shows a flowchart illustrating of a method according to an embodiment of the invention.

FIG. 6 shows a flowchart illustrating the various steps of conducting a transaction according to an embodiment of the transaction. At step 500, the mobile phone (i.e., the mobile handset 32) is in the idle state. In order to execute the mobile payment application in order to conduct a payment transaction, the user (i.e., the consumer 30) has two options in certain embodiments. In first option, the user can select a shortcut key as in step 502, such as a programmable "soft key" located on the phone, which directly executes the mobile payment application. In the second option, the user goes through the menu system of the phone to select the application, as in step 504. In certain embodiments, step 504 can further comprise entering a password into the mobile phone application, in order to authenticate the consumer 30 and prevent fraud. This results in the mobile payment application being executed and the mobile phone becoming ready to effect a transaction, as shown in steps 506 and 508. The mobile phone can then in step 510 display a message indicating that is ready to conduct a payment transaction.

At step 512, the mobile phone is ready to conduct the transaction. Step 512 is when a timer associated with the mobile phone begins counting down from the predetermined timeout time. Should no payment transaction occur before the predetermined timeout time elapses, the mobile payment application is disabled in step 528, and the mobile phone returns to the main application page on the mobile phone display in step 530. At this point, if the consumer 30 still wishes to conduct a payment transaction, she reselects the mobile payment application either in step 502 or step 504. However, in certain embodiments, after the mobile payment application has been deactivated due to a predetermined timeout time elapsing, a password will not need to be entered into the mobile payment application, even if originally required. This is because the consumer has already been authenticated by entering the password the first time, and necessitating further password inputs may discourage the consumer from making purchases.

If the phone is presented to an access device (e.g., a POS terminal) within the predetermined timeout time, a payment transaction will be conducted. The access device, which is a POS terminal 462 in this embodiment, is ready in step 516, and the phone is presented to the contactless reader element 18(*a*)-4 associated with POS terminal 18 in step 514. This allows the mobile phone 32 and the POS terminal 18 to communicate through near field communications, such that the payment application can transmit payment information to the merchant 22 through the POS terminal 18. The POS terminal will process the transaction in step 522, and the merchant 22 can complete the sale in step 524. The merchant 22 may provide a receipt to the consumer in step 526. Also, once the phone 412 is presented to the POS terminal in step 520, the mobile phone 32 can detect that a payment transaction has occurred, and can display the payment completion page to the user in step 518. Once the payment completion page is displayed, the mobile payment application is deactivated in step 528, and the mobile phone returns to the main application page on the mobile phone display in step 530.

Figure 7:
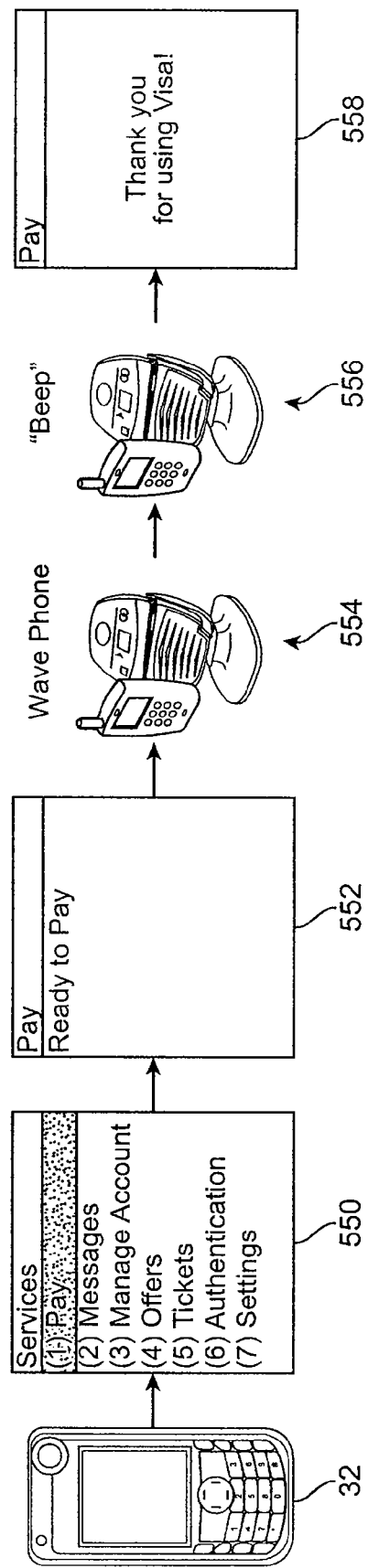
FIG. 7 shows a flowchart illustrating the various display screens of a mobile phone during a method according to an embodiment of the invention.

FIG. 7 shows a progression of screen shots of the display of a mobile phone 32 that is being used in the steps of FIG. 6. In screen shot 550, the mobile payment application has been executed and the pay functionality of the mobile payment application is selected. Once selected, the application shows that it is ready to engage in a payment transaction in screen shot 552. The consumer brings the mobile phone in proximity to the access device (or "waves" the mobile phone at the access device) in step 554 to effect the payment transaction. Once the payment transaction is effected, the access device will beep to show a successful payment transaction in step 556, and the mobile phone display shows a confirmation in screen shot 55.

Embodiments of the invention have a number of advantages. Mobile phones are ubiquitous, so adding payment functionality to them greatly expands the market for contactless payment devices. At the same time, the use of a timeout feature allows the phone to have full contactless card functionality, while removing limitations. Many potential users are hesitant to adopt contactless payment systems as they may unintentionally effect payment transactions merely by passing nearby access devices. With a timeout feature, this concern is minimized. Furthermore, the use of multiple instances of a mobile payment application on a mobile phone allows for the use of a variety of cards on a single phone. Combined with the timeout feature, the plurality of mobile payment applications allows a user to replace many payment cards with a single mobile phone without concern over accidental or surreptitious transmittal of any of the payment information.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:

entering a first configurable predetermined timeout time into a mobile phone, wherein the mobile phone comprises a contactless element that is configured to be read by a contactless reader in an access device, the mobile phone comprising a plurality of issuer specific mobile payment applications, each issuer specific mobile payment application associated with the mobile phone and capable of selection by a user, each issuer specific mobile payment application in the plurality of issuer specific mobile payment applications is associated with its own configurable predetermined timeout time, wherein the configurable predetermined timeout time is chosen by the user;

entering a password into a first issuer specific mobile payment application in the plurality of issuer specific mobile payment applications for a first time, the first issuer specific mobile payment application associated with payment account information;

initiating a first payment transaction using the mobile phone by executing the first issuer specific mobile payment application in the plurality of issuer specific mobile payment applications in the mobile phone after entering the password, wherein the first issuer specific mobile payment application has a pay functionality and is further configured for password protection;

during the first payment transaction, transmitting the payment account information to the access device, wherein the first issuer specific mobile payment application is a default mobile payment application;

during the first payment transaction, starting a timer to begin timing the first payment transaction and displaying a countdown timer that counts down from the first configurable predetermined timeout time;

for subsequent payment transactions before the first configurable predetermined timeout time has elapsed, reselecting the first issuer specific mobile payment application, the reselecting not requiring a password to be entered after the password is entered the first time, even while the first issuer specific mobile payment application is configured for password protection; and disabling the first issuer specific mobile payment application after the first configurable predetermined timeout time has elapsed.

2. The method of claim 1 wherein each issuer specific mobile payment application in the plurality of issuer specific mobile payment applications is associated with a different issuer specific payment service.

3. The method of claim 1 wherein the first configurable predetermined timeout time is 30 seconds.

4. The method of claim 1 wherein the access device is a point of sale terminal.

5. The method of claim 1 further comprising setting the first issuer specific payment application to an always on state where payment transactions can be conducted with the first issuer specific payment application while the mobile phone is on.

6. The method of claim 5 wherein a contactless payment using the first issuer specific payment application cannot be made using the mobile phone when the first issuer specific payment application is disabled.

7. The method of claim 6 wherein the executing the first issuer specific payment application is performed by pressing a soft key on the mobile phone.

8. The method of claim 7 further comprising, displaying by the mobile phone a message that the mobile phone is ready to conduct a transaction.

9. The method of claim 8 wherein the first issuer specific payment application is linked to a debit card.

\* \* \* \* \*